US007412344B2

(12) United States Patent
Chang et al.

(10) Patent No.: US 7,412,344 B2
(45) Date of Patent: Aug. 12, 2008

(54) SYSTEM FOR SYNCHRONOUSLY CONTROLLING THE TESTING OF PLURALITIES OF DEVICES AND THE METHOD OF THE SAME

(75) Inventors: Chao-Tang Chang, Jhubei (TW); Chi-Chang Wang, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 638 days.

(21) Appl. No.: 11/025,390

(22) Filed: Dec. 29, 2004

(65) Prior Publication Data

US 2006/0179919 A1   Aug. 17, 2006

(51) Int. Cl.
| | |
|---|---|
| G01M 19/00 | (2006.01) |
| G01M 3/02 | (2006.01) |
| G01R 31/00 | (2006.01) |
| G01R 31/14 | (2006.01) |
| G01R 31/02 | (2006.01) |
| G01R 31/28 | (2006.01) |
| G05B 15/02 | (2006.01) |
| G05B 11/01 | (2006.01) |
| G06F 11/00 | (2006.01) |
| G01N 19/00 | (2006.01) |
| H01H 31/02 | (2006.01) |
| G08B 29/00 | (2006.01) |

(52) U.S. Cl. .................. 702/121; 702/118; 700/9; 700/19; 700/20; 700/26; 714/25; 714/742; 73/37.8; 73/865.9; 324/73.1; 324/555; 324/763; 340/514

(58) Field of Classification Search ............ 700/9, 700/17, 19, 20, 26; 702/68, 108, 118, 121, 702/123; 712/227; 714/25, 27, 30, 46, 724, 714/742; 73/1.34, 37.8, 865.9; 324/73.1, 324/551, 555, 558, 559, 750, 755, 763; 370/241, 370/247, 251; 379/10.1; 340/514
See application file for complete search history.

(56) References Cited

U.S. PATENT DOCUMENTS 4,812,996 A * 3/1989 Stubbs ................. 702/123

(Continued)

FOREIGN PATENT DOCUMENTS

JP   58197550 A   * 11/1983

*Primary Examiner*—Crystal Barnes Bullock
(74) *Attorney, Agent, or Firm*—Thomas, Kayden, Horstemeyer & Risley

(57) ABSTRACT

The present invention discloses a system for synchronously controlling the testing of pluralities of devices, comprising a server, a switch coupled to the server, and a testing instrument coupled to the server. Pluralities of computers are coupled to the server respectively, wherein the pluralities of devices are respectively connected to the pluralities of computers and the switch under testing. The parameters of the pluralities of devices include a first type test item that is testable by the pluralities of computers, and a second type test item that is testable by the testing instrument. The switch includes a RF switch. The server is connected to the testing instrument by a GPIB cable (or other instrument control interface and the server is connected to the pluralities of computers via local area network (LAN) such as Ethernet.

22 Claims, 3 Drawing Sheets

U.S. PATENT DOCUMENTS

| | | | |
|---|---|---|---|
| 5,124,919 A * | 6/1992 | Kastelle | 701/29 |
| 5,460,029 A * | 10/1995 | Tuot | 73/1.34 |
| 5,577,255 A * | 11/1996 | Roemer et al. | 710/264 |
| 5,861,882 A * | 1/1999 | Sprenger et al. | 715/700 |
| 6,515,484 B1 * | 2/2003 | Bald et al. | 324/551 |
| 6,587,543 B1 * | 7/2003 | Howard et al. | 379/10.01 |
| 6,782,331 B2 * | 8/2004 | Ayadi | 702/68 |
| 7,095,718 B1 * | 8/2006 | Terry | 370/241 |
| 7,117,411 B2 * | 10/2006 | McNeely et al. | 714/724 |
| 7,120,545 B2 * | 10/2006 | Benvenga et al. | 702/68 |
| 2002/0133749 A1 * | 9/2002 | Petersen et al. | 714/27 |
| 2005/0240831 A1 * | 10/2005 | Balkman et al. | 714/46 |
| 2005/0265717 A1 * | 12/2005 | Zhou | 398/9 |

\* cited by examiner

SYSTEM FOR SYNCHRONOUSLY CONTROLLING THE TESTING OF PLURALITIES OF DEVICES AND THE METHOD OF THE SAME

FIELD OF THE INVENTION

The present invention relates to a testing system, more particular, to a method for synchronously controlling the testing of pluralities of device.

BACKGROUND OF THE INVENTION

A wireless or wired network system comprises one or more devices for communication purposes. The users may be communicated with the router device with personal computers or notebook computers via wireless or wired means. Pluralities of 802.11 wireless devices are designed for achieving aforementioned purposed, such as network interface card (NIC), access point (AP), gateway (GW) and embedded systems with wireless function. Fixed relay and routing assignments prevent adapting to dynamic network connectivity changes and results in less reliable message delivery. Modern high speed networking protocols provide both quality and bandwidth guarantees to every transport connection established across the network. In such high speed packet switching networks, many different classes of traffic share the common transmission resources. The network device must therefore be tested before launching to the market to meet the RF regulation of one country. The further purpose is to achieve better radio performance, the RF device's radio power need to be calibrated and verified.

FIG. 1 shows a conventional system for DUT (device under test) calibration. The DUT 120 is coupled to the PC 110 and the testing equipment 130. The current RF manufacturing calibration process is designed for one DUT (device under test) calibrated by one set of equipment 130, as shown in FIG. 1. The user or operator 100 loads/unloads the DUT 120 and operates the test program on PC 110 to test the DUT via the equipment 130. The test program on PC 110 controls both DUT 120 and equipment 130 to process test. Such configuration is called "single head" and is simple and easy to construct and implement. However, the equipments are idle when DUT is loaded, unloaded or processed without requiring the testing equipment. On the other hand, the operator is also nothing to deal with when the DUT is under testing. Base on the aforementioned drawbacks, the equipment utilization rate and the manufacturing throughput are needed to be improved. The equipment utilization is critical because the equipments used are expensive.

What is desired is provide a new testing system which can allow the device maker to improve the equipment utilization.

SUMMARY OF THE INVENTION

The purpose of the present invention is to provide a method for synchronously controlling the testing of pluralities of device.

The present invention discloses a system for synchronously controlling the testing of pluralities of devices, comprising a server, a switch coupled to the server, and a testing instrument coupled to the server. Pluralities of computers are coupled to the server respectively, wherein the pluralities of devices are respectively connected to the pluralities of computers and the switch under testing. The parameters of the pluralities of devices include a first type test item that is testable by the pluralities of computers, and a second type test item that is testable by the testing instrument. The switch includes a RF switch. The server is connected to the testing instrument by a GPIB cable and the server is connected to the pluralities of computers via local area network (LAN) such as Ethernet.

The present invention further discloses a method for synchronously controlling the testing of more than one device, comprising:

connecting pluralities of devices to corresponding testing computers, wherein each the pluralities of devices includes a first type of test item that is testable by the corresponding testing computers, and a second type of test item that is testable by an instrument;

testing the second type test item of a first device of the pluralities of devices by requesting controls to the instruments through a server, and testing the first type test item of the pluralities of devices by the corresponding testing computer, simultaneously;

testing the second type test item of a second device by requesting instrument control to the server after the test of the second type test item of the first device is accomplished, and testing the first type item of the pluralities of devices by the corresponding testing computer, simultaneously.

DETAILED DESCRIPTION OF THE PREFERRED EMBODIMENT

The present invention provides a method and means for providing device testing. The present invention provides a novel system that allows improving the equipment utilization.

RF Switch Testing Instruments Framework

Figure 1:
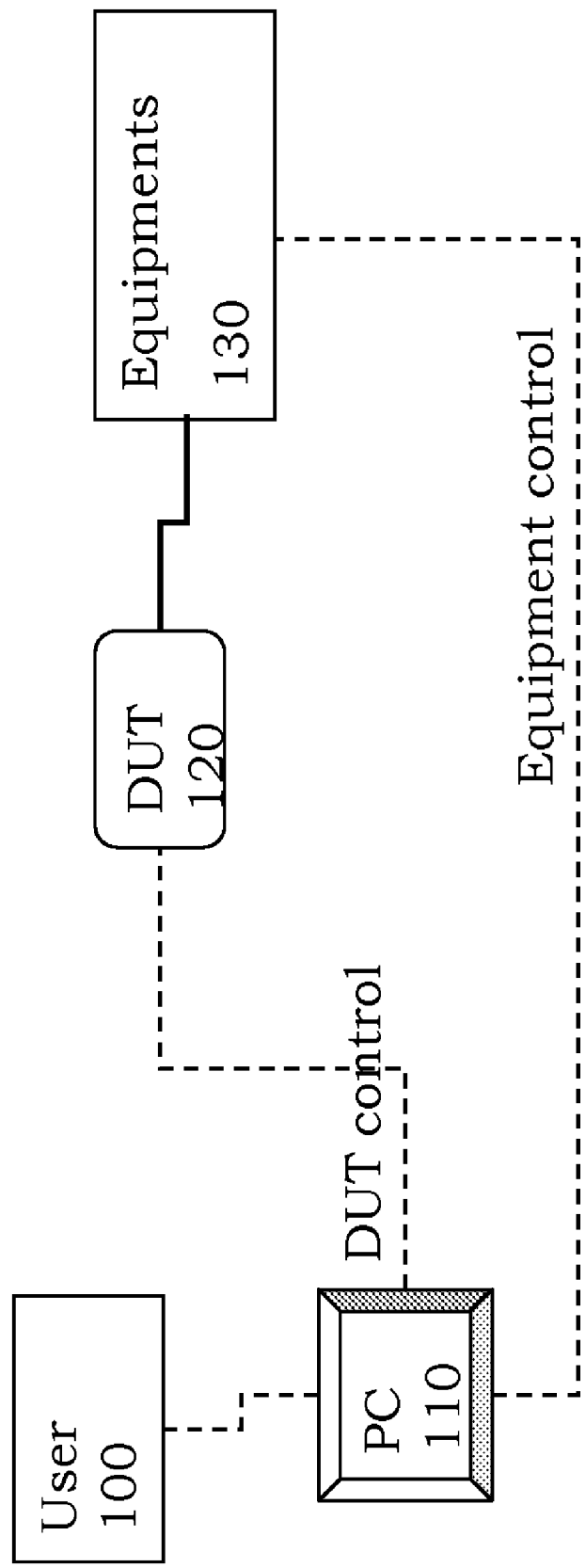
FIG. 1 illustrates a diagram of the testing system according to the prior art.
Figure 2:
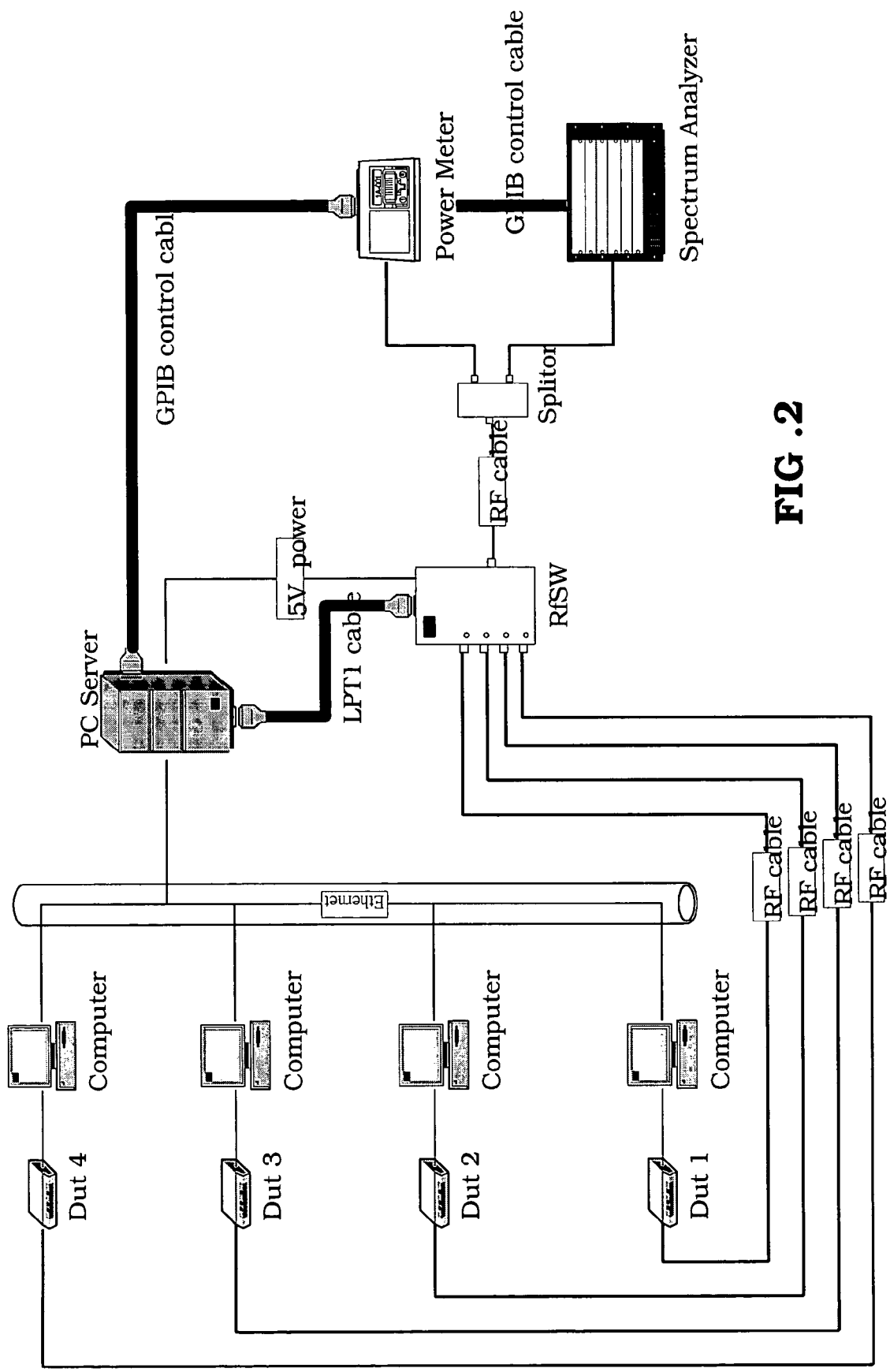
FIG. 2 illustrates a diagram of the testing system according to the present invention.

FIG. 2 shows the diagram of the framework of RF Switch Testing Instruments. The testing system includes a PC (personal computer) server that connects to the instruments of which can be controlled by the GPIB (General Purpose Interface Bus) or other interface. For example, spectrum analyzer (SA), power meter (PM), attenuator switch (AntSW), RF switch and so on. One of the connection methods is the usage of GPIB cable. Another end of the PC server is connected to the RF switch (RFSW) by using LPT1 (print port) cable. All of the testing PCs connect to the PC server via network such as Ethernet. In one example, the Ethernet connections could be established by using local network (LAN) which is constructed by connecting all of the Ethernet cables from server and testing PC to the same hub/switch. The DUT (device under test) may couple to the testing PC respectively. All of the DUTs are connected to the RFSW (switch) input ports by using RF cables. The RFSW output port is connected to GPIB instruments including spectrum analyzer via RF cable. The RFSW may control the connection status between the DUT and the GPIB instruments. Typically, the GPIB instruments may include a splitor, a power meter and a spectrum analyzer. In calibration process, the RF signal comes from DUT and is divided to power meter and spectrum analyzer through splitor. The power meter measures the RF signal strength, and the spectrum analyzer measures the spectrum of the RF signal.

In the illustration, the RFSW is controlled by the server and couples to the splitter. The power meter and the spectrum analyzer are respectively connected to the splitter. A GPIB cable is used to connect and control the power meter and the spectrum analyzer.

Processing Flow for Testing Instruments

Figure 3:
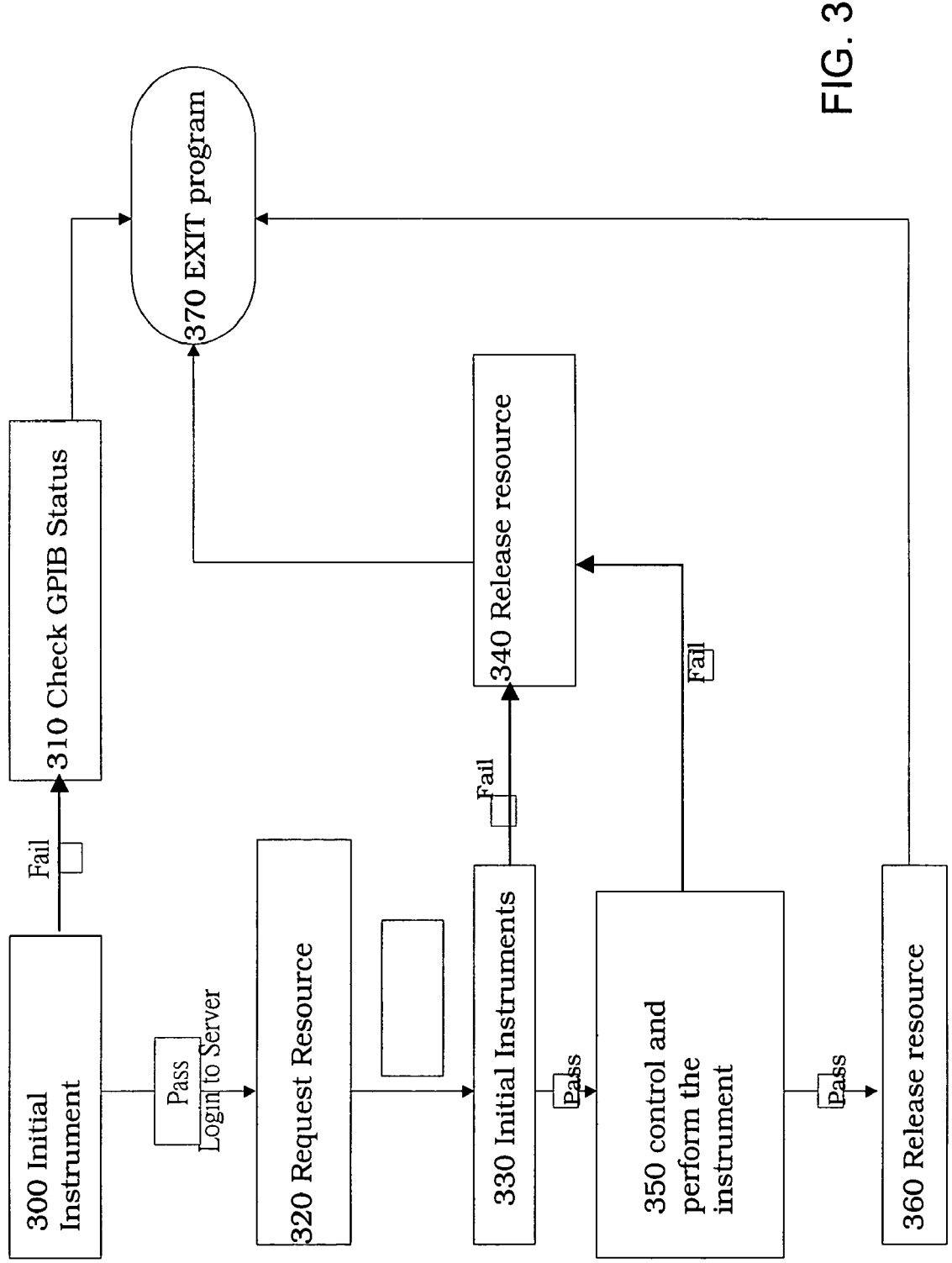
FIG. 3 is a process flow chart of the present invention.

FIG. 3 is the flow chart of the present invention. In the initial step 300, the instruments are initiated by the GPIB including a power meter, a splitor and a spectrum analyzer. If the step fails, then the system will check the GPIB status (310) and exit the program in step 370. Otherwise, the test program logins into the server, and in step 320 the test program requests the resource of the system. Once the test program gets the resource, the instruments are ready for it. The test program will wait for the resource until obtaining the resource. Then, the test program initiates the instruments in step 330. If the step is fail, then the test program will release the resource in step 340. On the contrary, the test program-control and utilize the instruments in step 350 to set the parameters such as SA center frequency, RFSW port and read power value and so on. If the step can not be achieved, the test program will release the resource in step 340 and exit the program in step 370. After the testing is accomplished in step 360, the test program will release the resource and exit the program in step 370.

A Method for Synchronously Controlling the Testing of More than One Device

During the testing step 350 of FIG. 3, please also refer to FIG. 2. The under testing parameters of the DUT includes two segments. One can be processed by the corresponding computer and other parameters should be tested by the instruments. Therefore, the process sequence includes:

connecting pluralities of DUT to a corresponding testing computer; wherein the DUT includes a first type of test item that is testable by the corresponding testing computer, and a second type of test item that is testable by the instruments;

testing the second type of test item of the first DUT by occupying the instruments' resource, and testing the first type test item of the first DUT and other DUT by the corresponding testing computer simultaneously;

after the test of the second type of test item of the first DUT is accomplished, the instruments' resource will be released and the second DUT can get the instruments' resource, then start test second type of test item of the second DUT. The instruments' resource assignment is controlled by the server PC. The tests of first type of test item of all the DUT excluding the second DUT are started simultaneously by the corresponding testing computer.

The system will repeat the above sequence until all of the DUT are tested. The method may save testing time and increase the instrument utilization by synchronously controlling the testing equipments.

The control is done by the server through a RFSW coupled to the splitor. The power meter and the spectrum analyzer are also coupled to the splitor as shown in FIG. 2.

RF Switch Testing Tools Framework

At the server side, the method includes steps of installing the RF switch driver and executing a MyKennel.reg program, followed by copying the MyKennel.sys to %windir%\system32\driver directory. For instance, in WA3001B AP testing program v0.500, the program is run install_GPIBSrv.bat under tools\GPIBServer directory and batch file. After the driver installation is done. The next step is to execute the RFSelector.exe to test the RFSW and the command line example: RFSelector/Open-RF 0 (0 is port number). One necessary step is to set CPIBCtrl.ini for server. WA3001B AP is the example setting for server in GPIBCtrl.ini. GPIB_CTRL section is used to set what instruments are connected to the server. PATH_LOSS_11B is used to set how much path loss between each DUT and PM/SA for GPIBCtrl.dll return actual power value or spectrum. The next step is to execute ResourceManager.exe and push start button to run server and wait client testing program request.

At the client side, the first step is to set WA3001B AP example setting for client testing program in GPIBCtrl.ini. GPIB_CTRL section is setting what instruments are connected to client. If the client is using Ethernet connecting to the server, all setting should be TCP. RFSwitchPort is used to set which port the DUT is connected and the DUTType is used to set base band 0 (WN11b=2.4 GHz) or 1 (WN11a=5 GHz). TCP_CTRL section is used to set TCP information. After setting GPIBCtrl.ini, subsequent step is to run the testing programs that support RF Switch to perform testing.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A system for synchronously controlling the testing of pluralities of devices, comprising:
   a server;
   a switch coupled to said server;
   a set of instrument coupled to said server;
   pluralities of computers coupled to said server respectively, wherein said pluralities of devices under testing are respectively connected to said pluralities of computers and said switch; and
   wherein the parameters of said pluralities of devices include a first type test item that is testable by said pluralities of computers, and a second type of test item that is testable by said set of instrument.

2. The system of claim 1, wherein said switch includes a RF switch.

3. The system of claim 1, wherein said server is connected to said set of instrument by a GPIB cable.

4. The system of claim 1, wherein said server is connected to said switch by a LPT1 (print port) cable.

5. The system of claim 1, wherein said server is connected to said pluralities of computers via network.

6. The system of claim 5, wherein said network includes an Ethernet.

7. The system of claim 5, wherein said network includes a local network (LAN).

8. The system of claim 1, wherein said switch is connected to said pluralities of devices via a RF cable.

9. The system of claim 1, wherein said instrument including a spectrum analyzer.

10. The system of claim 9, a splitter is connected between said switch and said spectrum analyzer.

11. A method for synchronously controlling the testing of pluralities of devices, comprising;
    connecting pluralities of devices to corresponding testing computers, wherein each said pluralities of devices includes a first type test item that is testable by said corresponding testing computer, and a second type test item that is testable by an instrument;

testing said second type test item of a first device of said pluralities of devices by requesting controls to said instrument through a server, and testing said first type test item of said pluralities of devices by said corresponding testing computer, simultaneously;

testing said second type test item of a second device by requesting instrument control to said server after the test of said second type test item of said first device is accomplished, and testing the said first type item of said pluralities of devices by said corresponding testing computer, simultaneously.

12. The method of claim 11, further comprising a switch to control the connection between said pluralities of devices and said instrument.

13. The method of claim 12, wherein said switch includes a RF switch.

14. The method of claim 12, wherein said server is connected to said switch by a LPT1 (print port) cable.

15. The method of claim 12, wherein said switch is connected to said pluralities of devices via a RF cable.

16. The method of claim 11, wherein said server is connected to said computers via network.

17. The method of claim 16, wherein said network includes an Ethernet.

18. The method of claim 16, wherein said network includes a local network (LAN).

19. The method of claim 11, wherein said server is connected to said instrument by a GPIB cable.

20. The method of claim 11, wherein said instrument including a spectrum analyzer.

21. The method of claim 11, wherein said instrument including a power meter.

22. The method of claim 11, further comprising a splitter connected between said switch and said set of instruments.

* * * * *